March 20, 1962 — H. N. IPSEN — 3,026,099
CONVEYOR FOR HEAT TREATING FURNACE
Filed June 27, 1960 — 2 Sheets-Sheet 2
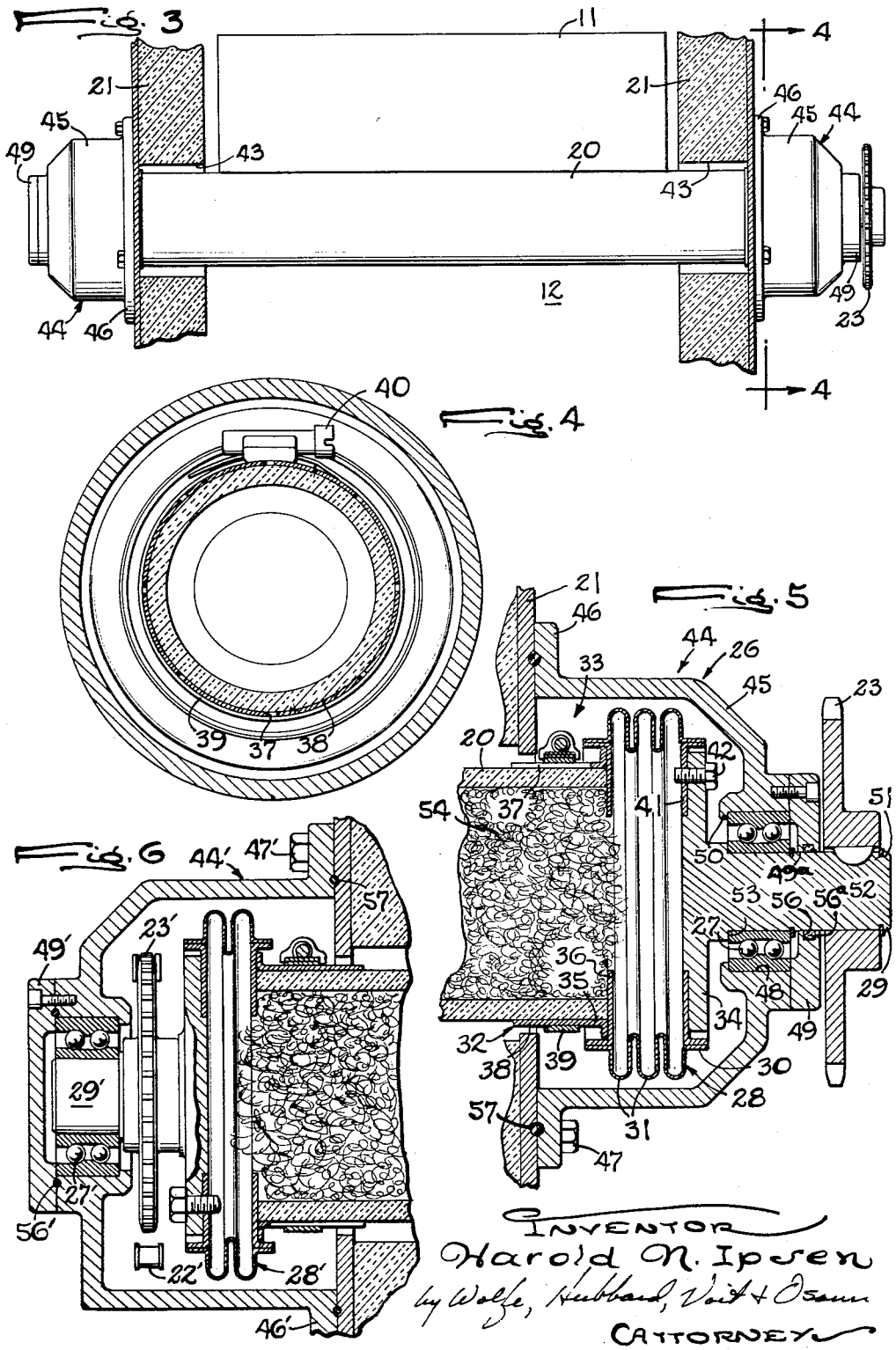
INVENTOR
Harold N. Ipsen
by Wolfe, Hubbard, Voit & Osann
ATTORNEYS United States Patent Office 3,026,099
Patented Mar. 20, 1962

3,026,099
CONVEYOR FOR HEAT TREATING FURNACE
Harold N. Ipsen, 715 S. Main St., Rockford, Ill.
Filed June 27, 1960, Ser. No. 39,114
6 Claims. (Cl. 263—6)

This invention relates to furnaces for treating metal workpieces in which the latter are moved into and out of a heating chamber on a conveyor and, more particularly, to a furnace having a conveyor composed of a plurality of rollers journaled in the heating chamber to turn about parallel axes.

The primary object of the invention is to provide, in a device of the above character, a conveyor constructed in a novel manner enabling it to withstand without detrimental effect both thermal stresses and stresses due to misalinement of the rollers relative to the bearings in which they are journaled.

Another object is to support the rollers between yieldable mounting means journaled in the chamber whereby expansion and contraction and misalinement of the rollers are absorbed by the mounting means.

Still another object is to support the rollers by a mounting means comprising yieldable bellows which may be pre-stressed to place the rollers under compression.

The invention also resides in the novel manner by which the bellows are attached to the rollers to compensate for out-of-roundness and variations in the diameter of the rollers.

Other objects and advantages of the invention will become apparent from the following detailed description taken in connection with the accompanying drawings, in which:

FIG. 3 is a fragmentary view showing one of the roller tubes journaled in the furnace.

FIG. 4 is a sectional view taken along line 4—4 in FIG. 3.

FIG. 5 is a sectional view taken along line 5—5 in FIG. 1.

FIG. 6 is a sectional view taken along line 6—6 in FIG. 2.

Figure 1:
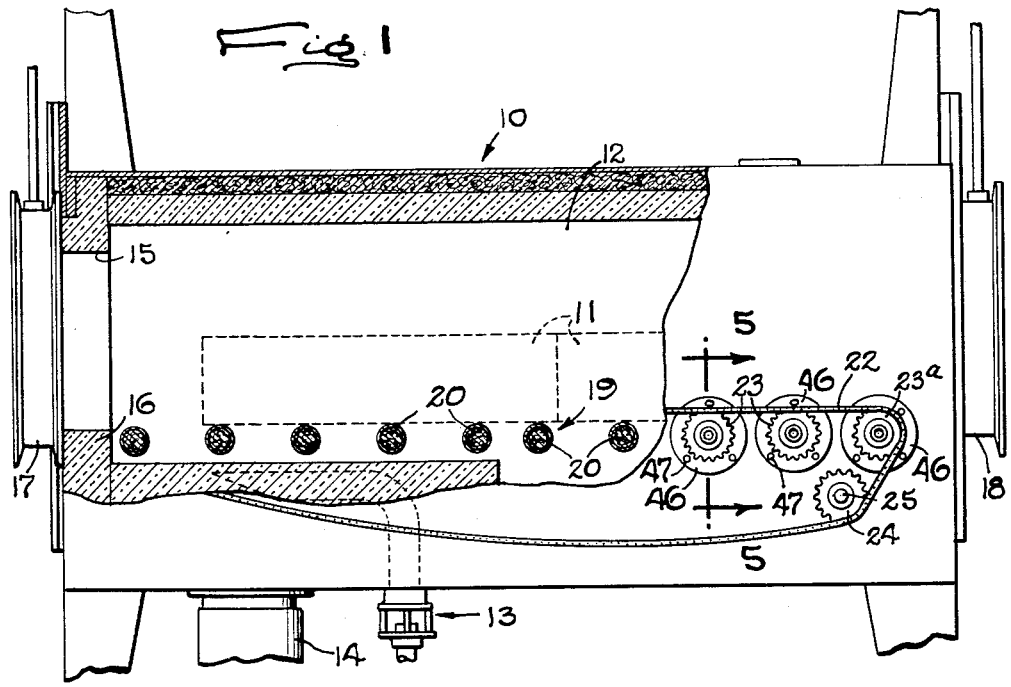
FIGURE 1 is a side elevation of a heat treating furnace embodying the novel features of the present invention, parts being broken away and shown in section.
Figure 2:
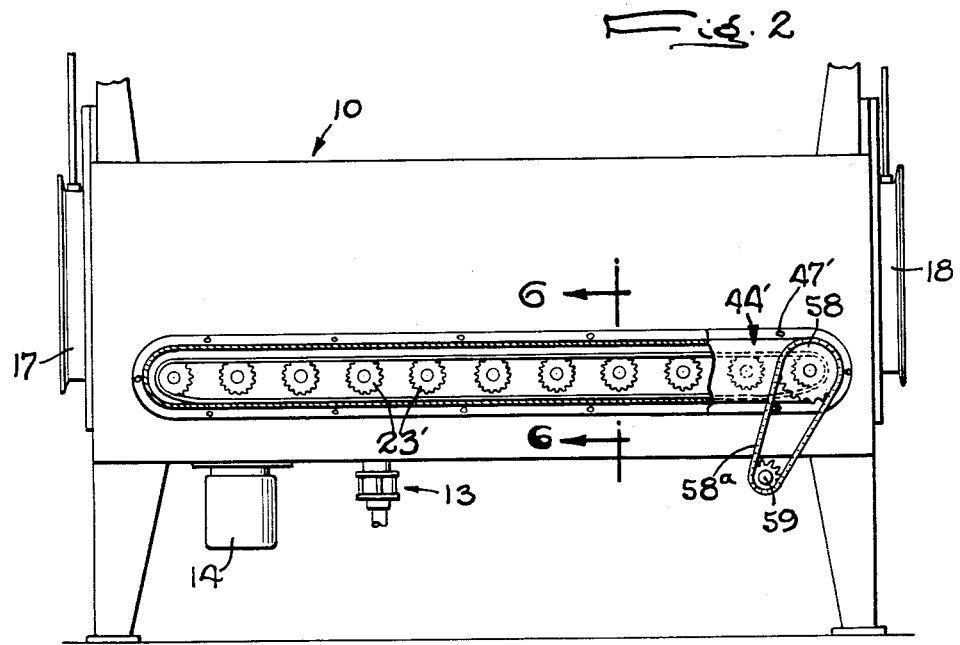
FIG. 2 is a side elevation of a furnace showing a modified form of the invention.

The present invention is shown in the drawings for purposes of illustration embodied in a furnace 10 of the type used for heat treating metal workpieces carried in trays 11. The furnace comprises a walled enclosure defining an elongated heating chamber 12 supplied with heated gases by a suitable burner apparatus 13 which gases are circulated by a fan (not shown) driven by an electric motor 14. The trays 11 are loaded into the heating chamber 12 through an opening 15 formed in an end wall 16 and controlled by a power operated door 17, and after the heating cycle is completed, the trays are moved out of the chamber 12 through an outlet opening controlled by a door 18 at the opposite end of the chamber. A conveyor 19 disposed in the chamber 12 and extending between the inlet and outlet openings, supports trays 11 and advances them through the furnace 10 (FIG. 1).

Herein, the conveyor 19 comprises a series of rollers 20 arranged side by side in the chamber 12 and journaled in opposite side walls 21 thereof to turn about parallel axes extending transversely of the path along which the workpieces are moved (FIG. 3). Rotation of the rollers 20 is accomplished through the medium of an endless chain 22 which extends along the chamber and meshes with sprockets 23 fast on one end of each roller 20. The chain 22 lies along the top of the sprockets 23, passes around the sprocket 23a on the end roller, meshes with a drive sprocket 24 and loops under the rollers 20 to the opposite end roller. The chain 22 is driven endwise by the drive sprocket 24 which is connected to a power rotated shaft 25.

Since the rollers 20 are disposed within the heated chamber 12, they are subjected to relatively high temperatures, temperatures that may result in distortion of the rollers and, after prolonged use, deformation of the rollers. In order to minimize the detrimental effects of the heat on the conveyor 19, the rollers 20 are usually made from a refractory ceramic material or from special alloys. In the present instance, elongated tubes of ceramic material are utilized. When such material is permitted to expand and contract upon being heated and cooled, it is able to withstand repeated heating to high temperatures and subsequent cooling without sufficient deformation as would render the conveyor useless.

In accordance with the present invention, the rollers 20 are secured in the heating chamber 21 through the medium of a novel mounting means 26 which permits journaling the rollers 20 in rigidly mounted bearings 27 whereby they are held in their proper position relative to the chamber and to each other while, at the same time, permitting the rollers to expand and contract when heated and cooled and to deflect laterally when subjected to uneven loading conditions such as would be caused by camber or misalinement of the rollers. For these purposes, the mounting means 26 comprises resilient bellows 28 disposed at the opposite ends of each roller 20 and coupling the roller to shafts 29 journaled in the bearings 27. Expansion and contraction of the roller 20 and misalinement of the roller relative to the bearings 27 is absorbed by the bellows 28 which yieldably hold the rollers between the shafts 29. When using a ceramic tube, the arrangement has the additional advantage of placing the tube under compression thus minimizing the danger of the tube breaking.

In the present instance, the bellows 28 comprise a cylinder 30 preferably made from a yieldable material such as stainless steel or the like and having one or more peripheral corrugations 31 formed intermediate the ends. An axially extending flange 32 around the inner end of the bellows 28 telescopes with the end of the tube 20 and is secured thereto by an adjustable clamp 33. A plate 34 fixed to the opposite end of the bellows 28 carries the axially projecting shaft 29 by which the bellows and thus the tube is journaled in the heating chamber 12.

Herein, the axial flange 32 comprises a sleeve 35 secured to and projecting outwardly from a radially disposed annular ring 36 fixed to the inner end of the bellows 28. The tube 20 is inserted into the sleeve 35 with the end of the tube abutting the ring 36 (FIG. 5). In order that a standard sized sleeve 35 may be telescoped on the ends of the tubes 20 regardless of variations in the outer diameter of the tubes, a series of longitudinally extending slits 37 are cut through the free end of the sleeve to form a plurality of tongues 38 operable to flex outwardly as the sleeve 35 is forced on the tube (FIG. 4). The clamp 33 holding the bellows 28 on the tube 20 is of the type commonly used on hoses and the like and includes a band 39 of flexible metal which band is wrapped around the tongues 38 with its opposite ends overlapping each other. An adjustment means, such as a screw 40 fixed to one end of the band and meshed with threads formed on the opposite end, draws the overlapping ends past each other upon turning of the screw thus decreasing the diameter of the band and forcing the tongues 38 against the periphery of the tube 20.

To attach the plate 34 and the shaft 29 to the bellows 28, a second radially disposed annular ring 41 is fixed to the outer end of the bellows. The plate 34 abuts the ring 41 and is secured thereto by screws 42 passing through the plate and threaded into the ring.

The roller tubes 20 project through openings 43 formed in the insulated side walls 21 of the heating chamber 12 and extend into housings 44 mounted on opposite sides of the furnace 12 and enclosing the bellows 28. Herein, the housings 44 comprise cup-shaped members 45 each having a peripheral flange 46 extending radially outwardly from the open end to engage the outer surface of the furnace wall 21. Bolts 47 passing through the flanges 46 secure the members 45 to the furnace 12.

The shafts 29 are journaled in the bearings 27 which are disposed in a bore 48 formed in the closed ends of the members 45. Caps 49 having a bore 49$^a$ are telescoped on the shafts 29 and bolted to the outer end of the members 45 to abut the bearings 27 and hold them in position between the cap and a radial flange 50 at the inner end of the bore 48 (FIG. 5). At one end of the roller tube 20 an extension 51 of the shaft 29 protrudes through the cap 49 and beyond the outer end of the member 45 and supports the sprocket 23 keyed thereto and held in position by a snap ring 52 encircling the shaft. Endwise displacement of the shafts 29 and the tube 20 is prevented by shoulders 53 formed on the shaft 29 to abut the inner sides of the bearing 27.

To reduce the amount of heat moving along the tubes 20 to the shafts 29 and thus to the bearings 27, the interiors of the tubes are filled with insulating material 54. Thus, since the bearings 27 are located outside of the insulated side walls 21 and since the flow of heat through the tubes is retarded by the insulating material 54, the bearings are maintained at a relatively low, efficient operating temperature.

In certain treating processes, the workpieces in the trays 11 are heated in a controlled atmosphere which may be composed of various gases which give the desired properties to the treated workpieces. To control the atmosphere in the furnace, the heating chamber 12 is sealed to prevent leakage of the gases therefrom or the leakage of air into the chamber. In the present instance a seal 57 is clamped between the flange 46 on the housing 44 and the side wall of the furnace and an O-ring 56 is seated in an inwardly opening groove 56$^a$ in the cap 49 to engage the shaft 29 and thus prevent leaking around the shaft.

When heating workpieces in a high vacuum, obtaining a satisfactory seal may be facilitated by making modifications to the housing 44 as shown in FIGS. 4 and 6. The modification includes providing a housing 44' to enclose several of the shafts 29' and bellows 28', one continuous housing being shown in the drawings to enclose the ends of all of the tubes 20'.

Herein, the housing encloses the bellows 28', the shaft 29', and the sprocket 23' keyed to the shaft. The shaft 28' is journaled in a bearing 27' mounted in the same manner as described above. A cap 49' bolted to the housing 44' covers the end of the shaft 29' and an O-ring 56' seals the cap on the housing. The elongated housing 44' is secured to the side of the furnace by bolts 47' extending through a flange 46' and into the side walls of the furnace. A seal 57' between the flange 46' and the side wall prevents leakage around the housing (FIG. 6). Since the shaft 29' does not project through the cap 49', the need for sealing a rotating shaft is eliminated.

As noted above, the sprocket 23' keyed to the shaft 29' at one end of each roller tube 20' is disposed within the housing 44'. An endless chain 22' extends along and meshes with each of the sprockets 23'. The shaft 29' supporting the end roller 20' of the conveyor, extends through the housing 44' and carries a sprocket 58 coupled by means of a chain 58$^a$ to a power driven shaft 59.

It will be apparent that by mounting the rollers of the conveyor in the manner described, the stresses on the rollers caused by thermal expansion and contraction and by misalinement are absorbed by the bellows and therefore have little, if any, detrimental effect on the operation of the conveyor. By compressing the bellows as the roller is mounted in the bearings, forces are exerted on the roller tending to compress it. While the ceramic material from which the rollers are formed is weak in tension, it is strong in compression and the present invention utilizes this strength to reduce the possibility of the roller breaking. In addition, by means of the bellows arrangement, a relatively large diameter roller having the desired beam strength may be journaled in standard nominal size bearings. The split sleeve compensates for variations in the diameters from tube to tube thus eliminating the need for close manufacturing control or machining of the rollers.

I claim as my invention:

1. In a conveyor for use in a heat treating furnace to move workpieces through a heating chamber, the combination of, a plurality of rollers disposed side by side along parallel axes in said chamber, shafts journaled in said chamber adjacent the ends of each roller to turn about said parallel axes, a cylindrical bellows fixed to each of said shafts to project axially thereof toward said rollers, a sleeve formed on the free end of each of said bellows to telescope with the ends of said rollers, and means encircling each of said sleeves to clamp the latter to said rollers.

2. In a device as defined by claim 1, said sleeve being slit at angularly spaced points to form flexible tongues operable to flex outward as said roller is inserted therein, and an adjustable clamping means operable to draw said tongues into close engagement with the periphery of said rollers.

3. In a heat treating furnace, the combination of, a walled structure defining a heating chamber, shafts projecting into said chamber from opposite sides thereof and journaled to turn about parallel axes in said chamber, rollers disposed in said chamber to lie along said axes between said shafts, and flexible bellows disposed at opposite ends of said rollers and coupling the rollers to said shafts, said bellows being initially compressed thereby to exert a force acting in compression on said rollers.

4. In a conveyor for moving workpieces through a heating chamber of a furnace, the combination of, a plurality of rollers disposed side by side along parallel axes in said heating chamber, shafts journaled in said chamber adjacent the ends of each of said rollers to turn about said axes, and bellows coupling the ends of said rollers to said shafts and operable to absorb axial expansion and contraction of said rollers and to permit misalinement of said rollers.

5. In a conveyor for moving workpieces through a heating chamber of a furnace, the combination of, a plurality of rollers disposed side by side along parallel axes in said heating chamber, shafts journaled in said chamber adjacent the ends of each of said rollers to turn about said axes, means coupling one end of each of said rollers to the adjacent shaft, and a bellows coupling the opposite end of each of said rollers to the adjacent shaft.

6. In a conveyor, the combination of, a frame having opposed side members, a shaft journaled in each of said side members to project inward along a predetermined axis, a cylindrical roller disposed between said shafts, and a bellows attached to each end of said roller to couple the roller to the adjacent shaft, said bellows being flexible to permit expansion and contraction and misalinement of said rollers.

References Cited in the file of this patent
UNITED STATES PATENTS

| | | |
|---|---|---|
| 1,871,227 | Smith et al. | Aug. 9, 1932 |
| 2,378,046 | Stergis | June 12, 1945 |
| 2,497,154 | Dailey et al. | Feb. 14, 1950 |
| 2,870,617 | Peters | Jan. 27, 1959 |
| 2,932,497 | Dailey et al. | Apr. 12, 1960 |